United States Patent [19]
Miller

[11] Patent Number: 5,956,386
[45] Date of Patent: Sep. 21, 1999

[54] TELEPHONE SUBSCRIBER LINE DIAGNOSTICS SYSTEM AND METHOD

[75] Inventor: Merle L. Miller, Austin, Tex.

[73] Assignee: Advanced Micro Devices, Inc., Austin, Tex.

[21] Appl. No.: 08/880,007

[22] Filed: Jun. 20, 1997

[51] Int. Cl.[6] ............................. H04M 1/24; H04M 3/08; H04M 3/22

[52] U.S. Cl. ................................. 379/27; 379/1; 379/26; 379/30

[58] Field of Search .................................. 397/1, 24, 26, 397/27, 30, 31, 32

[56] References Cited

U.S. PATENT DOCUMENTS

| | | | |
|---|---|---|---|
| 4,459,436 | 7/1984 | Rubin . | |
| 5,063,585 | 11/1991 | Shapiro | 379/27 |
| 5,073,920 | 12/1991 | Masukawa et al. | 379/30 |
| 5,202,882 | 4/1993 | Rudolf | 379/27 |
| 5,390,231 | 2/1995 | Hung et al. | 379/2 |
| 5,436,953 | 7/1995 | Nilson | 379/27 |
| 5,440,612 | 8/1995 | Siligoni et al. | 379/27 |
| 5,465,287 | 11/1995 | Egozi | 379/5 |
| 5,521,959 | 5/1996 | Walsworth et al. | 379/27 |
| 5,550,894 | 8/1996 | Charland | 379/2 |
| 5,606,592 | 2/1997 | Galloway et al. | 379/30 |
| 5,661,794 | 8/1997 | Rosch et al. | 379/339 |
| 5,881,129 | 3/1999 | Chen et al. | 379/5 |

FOREIGN PATENT DOCUMENTS

| | | | |
|---|---|---|---|
| 0 049 471 | 4/1982 | European Pat. Off. | H04M 3/30 |
| 0 543 161 | 5/1993 | European Pat. Off. | H04M 3/30 |
| 0 762 713 | 3/1997 | European Pat. Off. | H04M 3/30 |

OTHER PUBLICATIONS

Am79212/Am79C202 Advanced Subscriber Line Interface Circuit, Dec. 19, 1995, Chapter 8,9, and 10.

*Primary Examiner*—Curtis A. Kuntz
*Assistant Examiner*—Binh K. Tieu
*Attorney, Agent, or Firm*—Merchant, Gould, Smith, Edell, Welter & Schmidt, P.A.

[57] ABSTRACT

A system and method for performing diagnostic leakage impedance testing at the subscriber line interface utilizing portions of existing circuitry designated for driving current on the telephone line during normal operation is provided. The diagnostic apparatus is used with a telephone line drive system having a tip-line current-mode amplifier for driving current on the tip line and a ring-line current-mode amplifier for driving current on the ring line during normal operation. A control signal generator generates voltage control signals corresponding to desired subscriber loop voltage characteristics. A voltage sense circuit compares the voltage control signals to actual subscriber loop voltage characteristics resulting from driving the current on the subscriber loop. The current driven onto the subscriber loop is adjusted accordingly. A processor receives an indication of a current level of the current driven onto the subscriber loop, and calculates the leakage impedances on the subscriber loop in response to the current level and the voltage control signals.

17 Claims, 5 Drawing Sheets

TELEPHONE SUBSCRIBER LINE DIAGNOSTICS SYSTEM AND METHOD

FIELD OF THE INVENTION

The present invention is directed generally to telephone subscriber line diagnostics, and more particularly to a system and method for determining the existence and the magnitude of undesirable leakage resistances on the telephone subscriber line.

BACKGROUND OF THE INVENTION

The telephone subscriber loop is the portion of a telecommunications circuit which connects the central office to the customer premise equipment (CPE). Often referred to as the local loop or "last mile", the subscriber loop typically includes the wire, poles, terminals, conduit, and other outside plant items. The subscriber loop wiring comprises a two-wire twisted-pair cable to provide full duplex communications between the subscriber and the central office.

The local loop is the most expensive, and perhaps the least technically effective, portion of the entire telecommunications system today. The subscriber loop is also the most susceptible to transmission impairment, which is largely due to the subscriber loop being exposed to the elements as it hangs on poles or is buried in underground conduit to reach the end user. Adverse weather conditions, defective cable insulation, wet cables, and damaged or severed buried cable are just a few of the circumstances that can lead to degradation or total breakdown of normal telephone communication.

One principal type of fault which can occur on the subscriber loop is a leakage fault. For example, the tip and ring lines comprising the twisted-pair in the subscriber loop could be coupled through some finite amount of impedance. Leakage between the ring and/or tip line and ground is also an undesirable condition. This condition may degrade the optimal voltage differential between the tip and ring lines, and can also introduce very undesirable noise onto the communications line. Also, it can provide an early indication of an impending line failure.

There have traditionally been three categories of telephone subscriber line testing. First, local test desks (LTD) have been used to access a cable pair through the switching system at the central office. The LTD is a manually operated system which accesses the cable pair through a circuit in the switching system that connects the LTD to the line without ringing the telephone. Such a test requires dedicated test circuitry and a test board operator at the central office.

Another type of telephone subscriber line testing is automatic test equipment that accesses local loops through the switching system, similar to that of the LTD tests. Such a test is the line insulation test (LIT), which is performed at the central office by stepping through each telephone line and applying a line test.

Automatic test gear requires a relay on each telephone line to provide test access to the outside line. The test gear is generally contained in a separate rack, and is fairly expensive. This cost can be justified because, in a central office, it is shared among perhaps thousands of lines.

A modern trend is to move the interface to the subscriber loop into a remote terminal closer to the customer. The remote terminal is then connected to the central office switch gear by a digital link, which might use copper, fiber optics, or even radio. As the remote terminals are moved closer and closer to the customer, they also contain fewer and fewer telephone lines, until ultimately it may reside inside a customer's house and serve only one or two telephone loops inside the house. This process causes the cost of the test gear to be spread over fewer and fewer lines. Unfortunately, existing subscriber line circuits have never contained more minimal test circuitry. One subscriber line interface circuit is the advanced subscriber line interface circuit (ASLIC) Am79212/Am79C202 commercially available by Advanced Micro Devices, the assignee of the instant application.

However, the aforementioned prior art does not provide for subscriber line diagnostic testing which utilizes the existing current drive circuitry provided to drive the telephone connection during normal operation. The prior art typically includes separate circuitry, and often a separate diagnostic rack, to perform diagnostic testing. The prior art requires additional, valuable semiconductor real estate. The present invention provides a solution to these and other shortcomings of the prior art, and further provides additional advantages over the prior art.

SUMMARY OF THE INVENTION

Generally, the present invention relates to a system and method for performing diagnostic leakage impedance testing at the subscriber line interface utilizing portions of existing circuitry designated for driving current on the telephone line during normal operation.

In accordance with one embodiment of the invention, a telephone subscriber loop diagnostic system for determining leakage impedances on a telephone subscriber loop is provided. A control signal generation unit generates voltage control signals corresponding to desired subscriber loop voltage characteristics. A current drive circuit drives a current onto the subscriber loop in response to the voltage control signals. A voltage sense circuit compares the voltage control signals to actual subscriber loop voltage characteristics resulting from driving the current on the subscriber loop. The current driven onto the subscriber loop is adjusted in response thereto. A processing unit receives an indication of the level of current driven onto the subscriber loop, and calculates the leakage impedances on the subscriber loop in response to the current level and the voltage control signals.

In accordance with another embodiment of the invention, a current-drive, voltage-sense subscriber loop diagnostic apparatus is provided. The diagnostic apparatus is used with a telephone line drive system having a tip-line current-mode amplifier for driving current on the tip line and a ring-line current-mode amplifier for driving current on the ring line during normal operation. A control signal generator generates voltage control signals corresponding to desired subscriber loop voltage characteristics. A voltage sense circuit compares the voltage control signals to actual subscriber loop voltage characteristics resulting from driving the current on the subscriber loop. The current driven onto the subscriber loop is adjusted accordingly. A processor receives an indication of a current level of the current driven onto the subscriber loop, and calculates the leakage impedances on the subscriber loop in response to the current level and the voltage control signals.

In accordance with yet another embodiment of the invention, a method for performing leakage impedance diagnostics on a telephone subscriber loop comprising an A line and a B line is provided. Control signals are generated which correspond to desired telephone line signal levels. A current is driven onto each of the A and B lines having magnitudes proportional to their respective control signals. The A and B line voltages on the subscriber loop are monitored to determine the voltage level resulting on the A and B lines as a result of driving the current onto the A and B lines. Voltage feedback provides an adjustment to the control signals, and the current driven onto the A and B lines is adjusted accordingly. The line impedance can be calculated based on the control signals and the current driven on the A and B lines.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention generally provides a system and method for performing impedance leakage diagnostics on a telephone subscriber loop by integrating the diagnostic system and the telephone interface circuitry at the subscriber line interface. Such diagnostic tests are typically performed during a time when the telephone is not in use, that is, the telephone is on-hook.

Figure 1:
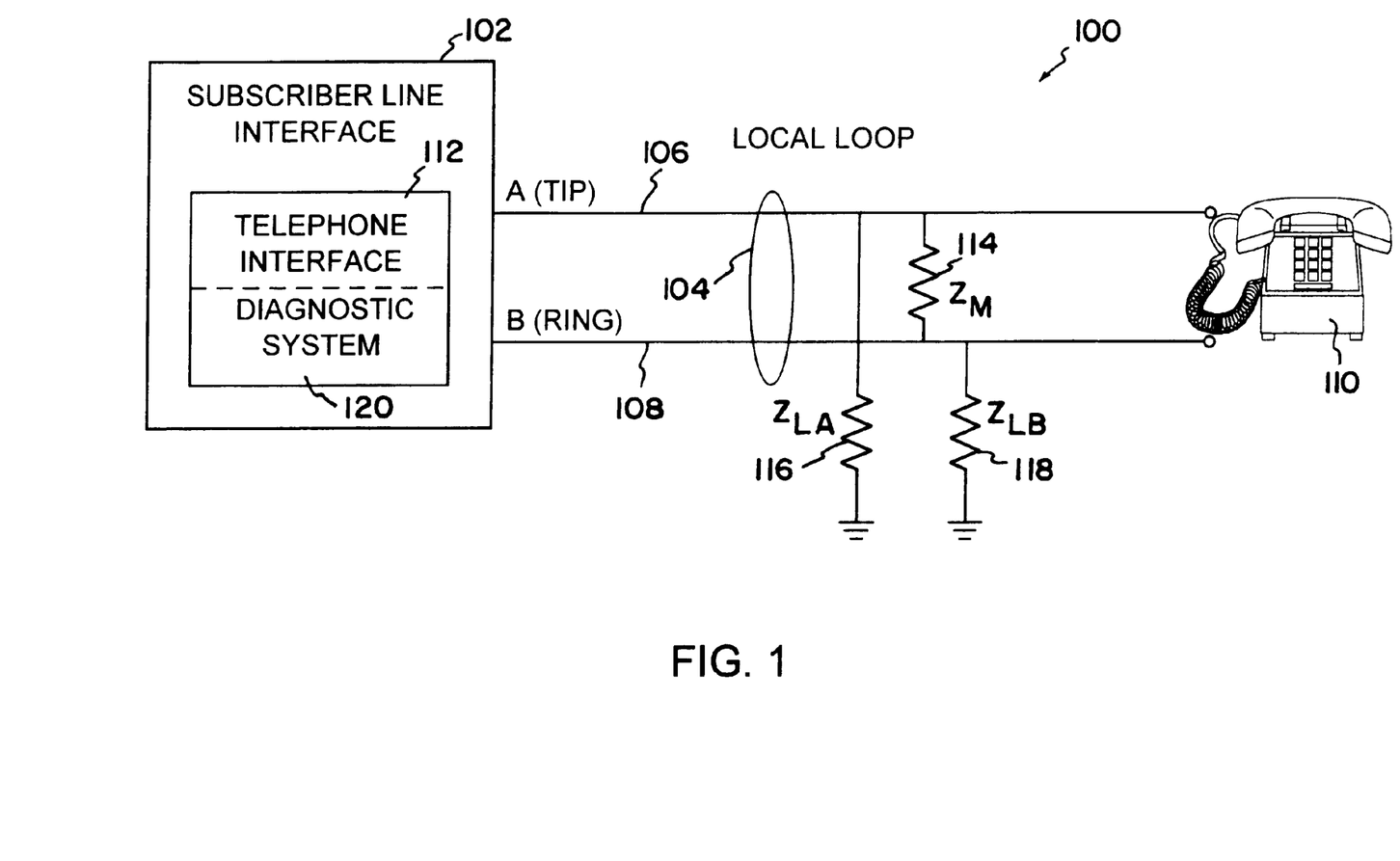
FIG. 1 is a block diagram of one embodiment of a subscriber loop and subscriber line interface arrangement in accordance with the present invention.

FIG. 1 is a block diagram of one embodiment of a subscriber loop and subscriber line interface arrangement 100 in accordance with the present invention. The subscriber line interface 102 is the interface between the local subscriber loop 104 and the telephone and switching circuitry provided by the local telephone company. The local loop 104 is typically a copper twisted-pair cable comprising the A telephone line (also known as the "tip" line) which is typically coupled to a DC battery return, and the B line (also known as the "ring" line) 108 is typically coupled to the DC battery source provided by the central office. The local loop, or subscriber loop, is capable of providing voice and data communication. The central office, or other station providing an equivalent service, applies various DC voltages to the two-wire local loop 104. In the idle state, the DC voltage is typically −48 (+/−6) volts. The tip 106 and ring 108 lines provide the communication and power connection to customer premises equipment (CPE), represented in FIG. 1 by telephone 110.

At the subscriber line interface 102 is the telephone interface circuitry 112 which provides the DC voltage to the customer premises equipment via the local loop 104. The line interface 102 may reside at the central office of the telephone company, or may alternatively reside at a more remote location from the central office such as a neighborhood or curbside pedestal. The telephone interface circuit 112 uses the DC voltage source at the central office, and drives the required current on the tip and ring lines 106, 108 which is needed to operate the customer premises equipment. Typically, the telephone interface circuit 112 receives the DC central office battery voltage, drives the telephone line, and performs other high voltage duties such as ringing the telephone.

The local loop 104 is the part of the telecommunications circuit which is most susceptible to transmission impairment. For this reason, it is desirable to perform diagnostic testing of the subscriber loop 104 to discover the presence of leakage conductances which degrade communication performance and integrity. For example, current leaks between the tip 106 and ring 108 lines may occur through the finite impedance value $Z_M$ 114 in which an errant current can flow. $Z_M$ 114 represents an undesirable conductance between the tip and ring lines 106, 108 which may be caused by a short-circuit, a wet cable, or the like. Currents conducting between the tip 106 and ring 108 lines are referred to as metallic currents.

Similarly, leakage currents may exist between the tip line 106 and ground, and/or the ring line 108 and ground. Currents conducting between either the tip 106 or ring 108 lines to ground are referred to as longitudinal currents. These conductances are made possible by the finite impedance values labeled $Z_{LA}$ 116 and $Z_{LB}$ 118, which undesirably couple the local loop 104 to ground. This introduces an undesirable source of noise during telephonic communication. Both metallic and longitudinal currents may be detected in a preventative manner wherein the existence of leakage currents are periodically monitored, or alternatively may be discovered upon curative diagnostic testing prompted by the occurrence of a resistive fault or AC or DC foreign voltage detected on the telephone line. Continual monitoring for such resistive faults or AC/DC foreign voltages may be determined in a manner described herein and in copending U.S. patent application, Ser. No. 08/879,986, entitled "System and Method for Programmable Telephone Subscriber Line Test", which is assigned to the assignee of the instant application, the contents of which are incorporated herein by reference.

In order to perform the aforementioned diagnostic testing, the present invention provides the diagnostic system 120 which in one embodiment of the invention is integrated with the telephone interface circuitry 112. This circuit integration provides reduced cost, and reduced circuit size, as circuitry common to the telephone line drivers can be used in the diagnostic testing. In one embodiment of the invention, the diagnostic system circuitry 120 is accomplished using circuitry common to the telephone interface circuitry 112, such as the current amplifiers which drive the A (tip) and B (ring) lines 106, 108.

An advantage to using diagnostic circuitry common to the telephone interface circuit 112 is that a reduced amount of circuitry is required for diagnostics. However, using circuitry such as the current-mode amplifiers driving the A and B lines 106, 108 requires diagnostics based on current drive. Current drive is often used to drive a telephone line because current will have to be limited at times, and it is more effective to limit current than to adjust voltages on the telephone lines. Current often needs to be limited in the case where the subscriber loop is very short compared to longer subscriber loops which sometimes exceed 3 miles. The short subscriber loops therefore have a higher conductance due to the relatively small resistance of the shorter twisted-pair line. Therefore, for a diagnostic system to make use of circuitry common to the line interface circuitry which powers the telephone during normal use, the diagnostic system should be configured to operate on a current drive basis.

Figure 2:
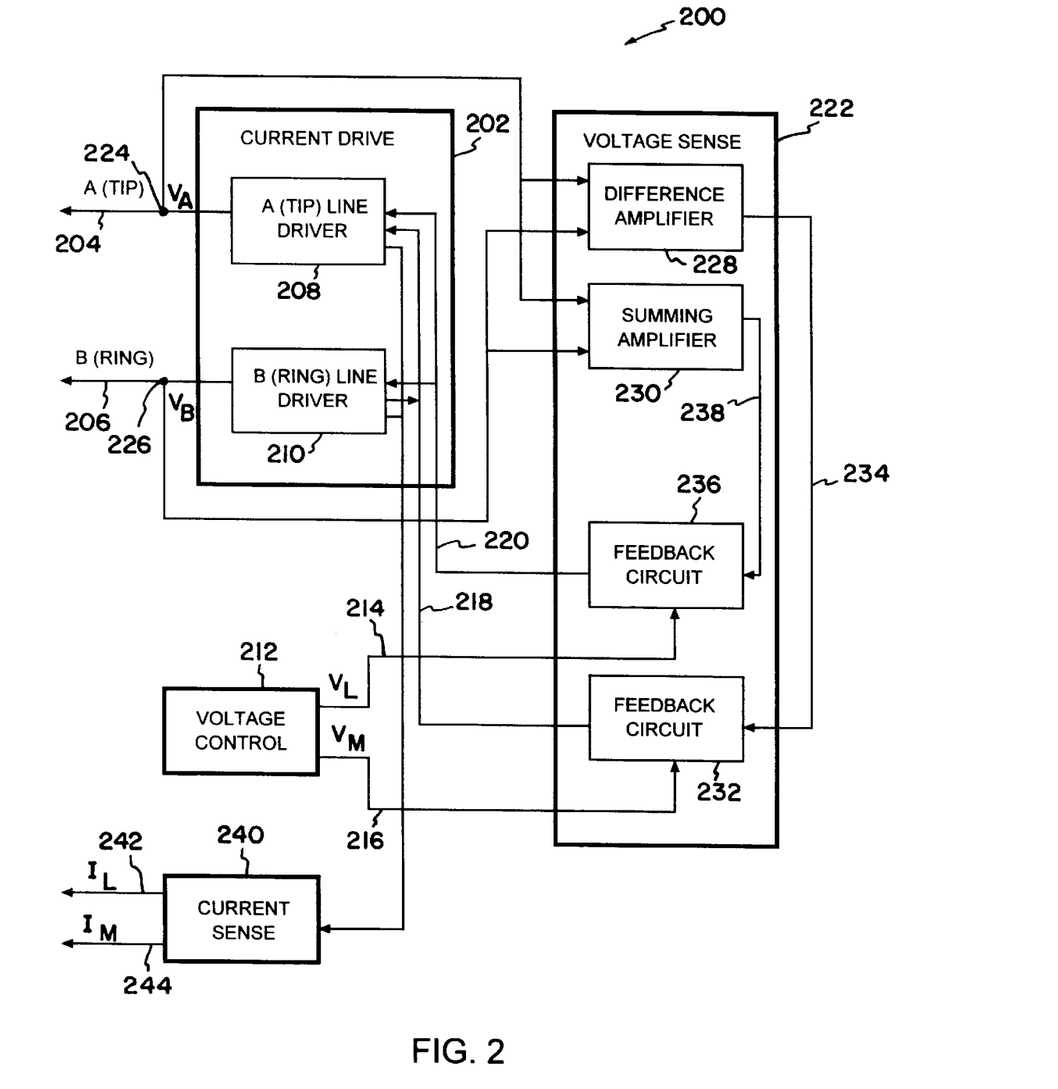
FIG. 2 is a block diagram of one embodiment of a diagnostic system in accordance with the present invention.

FIG. 2 is a block diagram of one embodiment of a diagnostic system 200 in accordance with the present invention. The current drive circuitry 202 is used to drive the required currents on the telephone line for normal operation of the telephone on the subscriber loop which includes the A (tip) 204 and the B (ring) 206 lines. The current drive circuit 202 includes the A line driver 208 and the B line driver 210, which are current-mode amplifiers. These amplifiers drive current on the A 204 and B 206 lines. The present invention utilizes the existing current drivers in the current drive circuitry 202 to provide subscriber line diagnostic testing.

In order to apply a voltage to the A 204 and B 206 lines, the voltage control circuit 212 generates a metallic voltage $V_L$ and a longitudinal voltage $V_M$ on lines 214 and 216 respectively. The metallic control voltage $V_M$ is proportional to the desired differential voltage between the A 204 and B 206 lines, and the longitudinal control voltage $V_L$ is proportional to the desired sum of the voltages on the A 204 and B 206 lines. $V_M$ is converted to current through a resistance which is then provided to the A line driver 208 and the B line driver 210 in a differential manner, where an increase in current on the A line 204 results in a decrease in current on the B line 206. This is illustrated by the oppositely-directed arrows from the A and B line drivers 208, 210 from line 218. $V_L$ is also converted to current through a resistance, and is provided to the A line driver 208 and the B line driver 210 in a summing manner. Therefore, an increase in current on the A line 204 is paralleled by an increase in current on the B line 206. This is illustrated by the similarly-directed arrows to the A and B line drivers 208, 210 from line 220. A more detailed description of the current drive control is provided in connection with FIG. 4.

When current is provided on the A 204 and B 206 lines, the voltage sense circuit 222 is configured to sense the voltage at nodes $V_A$ 224 and $V_B$ 226. These sensed voltages are provided to the difference amplifier 228 and the summing amplifier 230 of the voltage sense circuit 222. The difference amplifier 228 provides a signal, which corresponds to the difference between the voltages at nodes $V_A$ 224 and $V_B$ 226, to the feedback block 232. The differential voltage between the feedback signal on line 234 and the $V_M$ signal on line 216 is then provided to the current drive circuit 202 as an adjusted current, which oppositely adjusts the amount of current driven onto the A 204 and B 206 lines. Similarly, the summing amplifier 230 provides a signal, which corresponds to the sum of the voltages at nodes $V_A$ 224 and $V_B$ 226, to the feedback block 236. The differential voltage between the feedback signal on line 238 and the $V_L$ signal on line 214 is provided to the current drive circuit 202 as an adjusted current, which correspondingly adjusts the amount of current driven onto the A 204 and B 206 lines.

As these currents are driven onto the A 204 and B 206 lines, the current sense 240 monitors the current being driven by the A line driver 208 and the B line driver 210. This is represented by a longitudinal current $I_L$ and a metallic current $I_M$ as shown on lines 242 and 244 respectively. Using the current values sensed by the current sense 240 and the voltage values applied by the voltage control 212, leakage impedances on the telephone line can be calculated.

Figure 3:
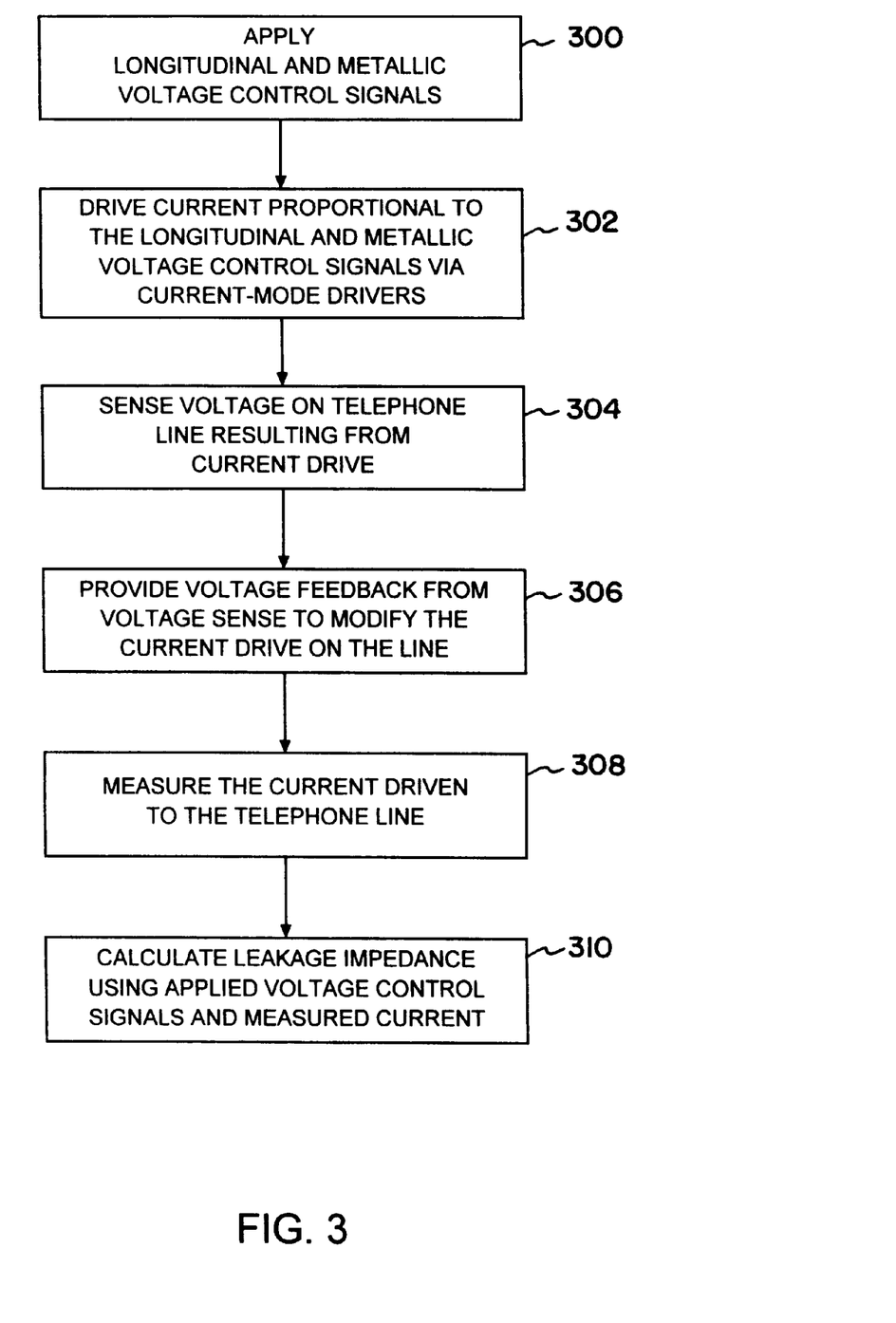
FIG. 3 is a flow diagram of one manner in which leakage impedances are determined in accordance with the present invention.

FIG. 3 is a flow diagram of one manner in which leakage impedances are determined in accordance with the present invention. Longitudinal and metallic voltage control signals are applied 300 as signals to control the voltage at nodes $V_A$ and $V_B$. These signals can be generated using a programmable processing system, wherein the voltage values $V_L$ and $V_M$ are programmable. Alternatively, a voltage generator may be used to apply the voltage control signals.

These voltage control signals are converted to currents, which drive the current-mode amplifiers which were shown in FIG. 2 as the A line driver 208 and the B line driver 210. These currents are proportional to their originating voltage control signals, and this current is used to drive 302 the A line driver 208 and the B line driver 210. The resulting voltage on the A line driver 208 and the B line driver 210 is sensed 304, and voltage feedback is provided 306 to modify the current drive on lines A and B of the telephone line. The current being driven on the line is measured 308, and together with the applied voltage control signals is used to calculate 310 the leakage impedances $Z_M$, $Z_{LA}$ and $Z_{LB}$ on the telephone subscriber line.

Figure 4:
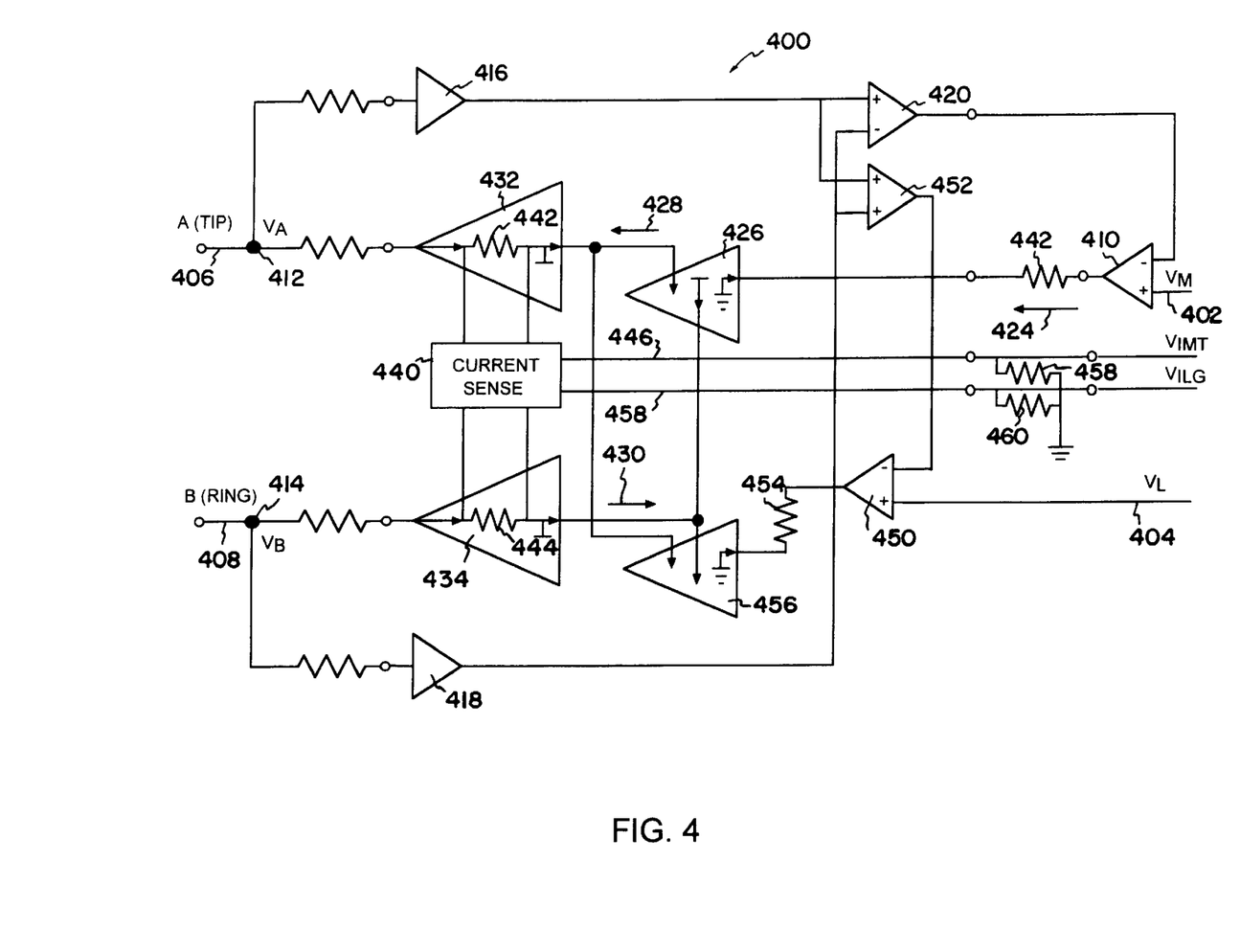
FIG. 4 is a schematic diagram of one embodiment of a current drive voltage sense subscriber line diagnostic circuit in accordance with the present invention.

Referring now to FIG. 4, a schematic diagram of one embodiment of a current drive, voltage sense subscriber line diagnostic circuit 400 in accordance with the present invention is illustrated. The voltage control signals $V_M$ and $V_L$ are provided to the diagnostic circuit 400 as shown on lines 402 and 404. The generation of the $V_M$ and $V_L$ voltage control signals is described in greater detail in connection with FIG. 5.

The "metallic" portion of the circuit includes the portion which senses a voltage difference between the A and B lines of the subscriber loop shown on lines 406 and 408 respectively. The metallic portion does not include a system ground, but rather includes only the floating wire loop comprising the twisted-pair telephone line. A metallic voltage setpoint $V_M$ on line 402 is provided to the differential amplifier 410. $V_M$ is set to be proportional to a desired $V_A-V_B$ value, where $V_A$ is the voltage at node 412 and $V_B$ is the voltage at node 414. Therefore, the $V_M$ setpoint dictates what the voltage difference between the voltage on the A line 406 and the B line 408 will be set to.

The voltages existing on the telephone line at the $V_A$ 412 and $V_B$ 414 nodes are provided to buffers 416 and 418. These outputs are then directed to the differential amplifier 420, which has one inverting and one non-inverting input. The output of the differential amplifier 420 is proportional to the difference between the A and B node voltages ($V_A-V_B$). This amplified difference is compared to the voltage control value for $V_M$ (set to $V_A-V_B$) at differential amplifier 410, and the difference between the actual and the set $V_A-V_B$ is provided at the output of amplifier 410.

The output of the differential amplifier 410 is converted to a current by presenting the voltage to the resistance 422. Therefore, where the actual voltage differential is less than the $V_M$ control voltage, it may indicate a metallic leakage between the A and B lines. In this case, a current will flow through the resistance 422 in the direction of arrow 424, which will cause output currents from amplifier 426 to flow in the direction of arrows 428 and 430. The arrows within the amplifiers 426, 432, 434 and 456 represent a preselected current direction convention. Therefore, as current is driven into amplifier 426 in the direction of arrow 424, current flows into amplifier 432 in the direction of arrow 428. The current at the inputs of current-mode amplifiers 432 and 434 are therefore in opposite directions, which causes the voltages at nodes $V_A$ 412 and $V_B$ 414 to approach the control voltage $V_M$ from line 402. However, the current through the amplifiers 432 and 434 changes as a result of the difference between the control voltage $V_M$ and the output of differential amplifier 420 which represents the actual $V_A$-$V_B$.

As the current through amplifiers 432 and 434 changes, the current sense circuitry 440 monitors the actual current driven on the A 406 and B 408 lines by monitoring across a resistance 442 and 444. The current sense 440 develops an output current on line 446 which is proportional to the difference between the currents through resistances 442 and 444. This current on line 446 may optionally be converted into a voltage prior to analyzing it, by providing a resistance 448 from line 446 to ground, thereby providing a voltage $V_{IMT}$ proportional to the metallic leakage current. As can be seen, this arrangement allows a differential voltage to be applied as an input, and provides a differential current (or a voltage proportional to the differential current) as an output to be analyzed by a monitor circuit.

The "longitudinal" portion of the circuit includes the portion which senses voltage differences between the A 406 and/or B 408 lines and ground. As previously indicated, telephone communications are to take place on the floating twisted-pair loop, and are not intended for use through a ground connection. This is due to the high noise content possible on telephone lines which included a ground connection. The diagnostic system of the present invention therefore provides for "longitudinal" impedance calculation to ascertain the existence of current leakages between the A and/or B lines and ground.

A longitudinal voltage setpoint $V_L$ on line 404 is provided to the differential amplifier 450. $V_L$ is set to be proportional to a desired $(V_A+V_B)/2$ value, which represents the common-mode voltage, where $V_A$ is the voltage at node 412 and $V_B$ is the voltage at node 414. Therefore, the $V_L$ setpoint dictates what the voltage average, or common-mode voltage, for the voltage on the A line 406 and the B line 408 will be set to.

The voltages existing on the telephone line at the $V_A$ 412 and $V_B$ 414 nodes are provided to buffers 416 and 418, which are provided to the summing amplifier 452. Summing amplifier 452 is not a differential amplifier, as both of its inputs are non-inverting, with a gain of ½ to provide the average $(V_A-V_B)/2$ of the voltages on the telephone line. This average is compared to the voltage control value for $V_L$, which is set to $(V_A+V_B)/2$, at differential amplifier 450. The resulting difference between the actual average determined by summing amplifier 452 and the $V_L$ control voltage on line 404 is provided at the output of amplifier 450. It should be noted that a small signal $V_L$ control voltage may require amplification prior to being input to amplifier 450 and the remaining current drive circuitry.

The output of differential amplifier 450 is converted to a current by presenting the differential output voltage to the resistance 454. Where the actual average voltage varies from the $V_L$ control voltage, it may indicate longitudinal leakages between the A and/or B lines and ground. In this case, a current will flow through the resistance 454, which will cause output currents from amplifier 456 to flow in the same direction. The current at the inputs of current-mode amplifiers 432 and 434 therefore flows in the same direction, which causes the voltages at nodes $V_A$ 412 and $V_B$ 414 to mutually increase or decrease. However, the current through the amplifiers 432 and 434 changes as a result of the mutual increase or decrease, which can then be monitored.

As the current through amplifiers 432 and 434 together increase or decrease, the current sense circuitry 440 again monitors the actual current driven on the A 406 and B 408 lines by monitoring across the resistances 442 and 444. The current sense 440 develops an output current on line 458 which is proportional to the sum of the currents through resistances 442 and 444. This current on line 458 may optionally be converted into a voltage prior to analyzing it, by providing a resistance 460 from line 458 to ground, thereby providing a voltage $V_{ILG}$ proportional to the longitudinal leakage current.

Ideally, where there are no longitudinal leakage currents between the A 406 and/or B 408 lines and ground, the telephone properly floats, and the application of a longitudinal voltage $V_L$ will not generate any net current to or from ground. Therefore, the feedback will continually provide a common-mode voltage approximately equal to the voltage control point $V_L$. However, where there is current leakage from either or both the A 406 and/or B 408 line to ground, current will flow between that line and ground, and the currents flowing in the A 406 and/or B 408 lines will be unequal. This is due to a faulty conductance to ground on one line and not the other.

Figure 5:
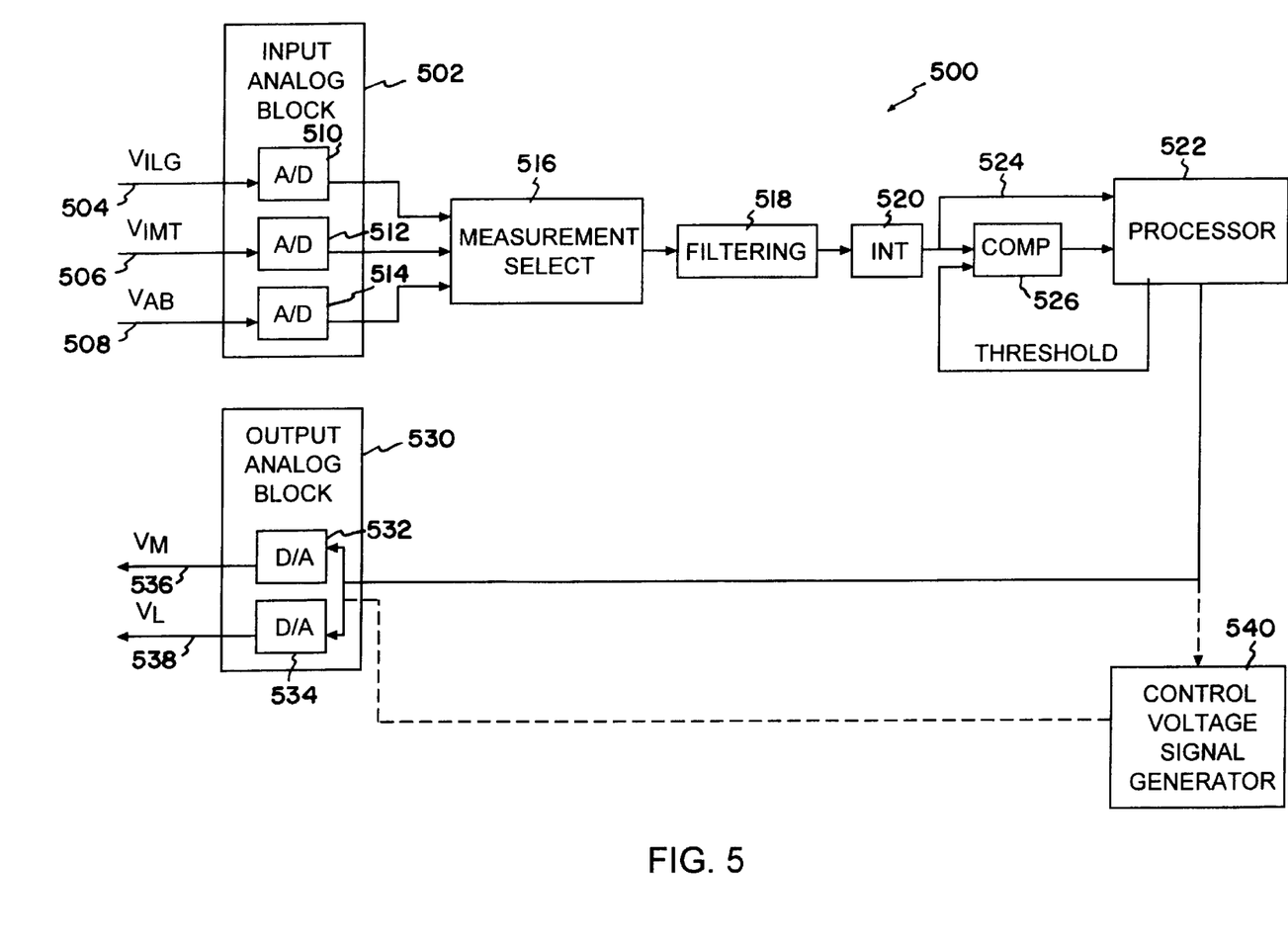
FIG. 5 is a block diagram illustrating one embodiment of the diagnostic monitoring system in accordance with the present invention.

FIG. 5 is a block diagram illustrating one embodiment of the diagnostic system monitoring system in accordance with the present invention. The longitudinal and metallic currents sensed at the current sense block 440 of FIG. 4 are received by the monitoring system 500 for use in determining leakage impedances on the telephone subscriber line. In one embodiment of the invention, the currents sensed at the current sense block 440 of FIG. 4 are converted to voltage values by passing the currents through resistances to ground. These voltages are then sensed at the input analog block 502 of FIG. 5. It should be noted however, that the input analog block 502 could alternatively be configured to receive analog currents rather than analog voltages. The voltage corresponding to the longitudinal current is labeled $V_{ILG}$ on line 504, while the voltage corresponding to the metallic current is labeled $V_{IMT}$ shown on line 506. A voltage corresponding to the difference between the A and B telephone lines is provided as the $V_{AB}$ signal on line 508. Each of these voltages enters an analog-to-digital (A/D) converter 510, 512, and 514. The measurement select 516 performs a multiplexing function to select one of the signals at the outputs of A/D converters 510, 512 and 514 to be measured at a given time. The measurement select circuit 516 can be configured in hardware having a control signal (not shown) coded to select one of its inputs. The multiplexing function of the measurement select 516 can alternatively be configured in software, as is known by those skilled in the art.

The selected one of the signals, for example the voltage corresponding to the longitudinal current $V_{ILG}$ on line 504, enters the filtering block 518, which provides a strong low pass filter to remove AC components. The signal is further processed by integrator 520, which is configured to average the signal over one period of time for signals having low frequency, non-DC components making it through the low pass filtering 518. It should be recognized that for substantially DC component signals the filtering 518 and integration 520 becomes unnecessary.

The digital voltage signal to be processed is provided to the processor 522 as is depicted on line 524. This digital value can be directly analyzed by the processor 522. The processor 522 can use this value in connection with the control voltage originally provided to drive the current amplifiers in order to arrive at an impedance value. Alternatively, the digital voltage value may be provided to a comparator 526 which will compare the digital voltage value to a threshold value on line 528 which may be provided by the processor 522 or may be hard coded into the comparator 526. In such a case, the comparator provides an indication to the processor 522 when it recognizes that the digital voltage has surpassed the threshold level on line 528. This type of test allows for a threshold level to be programmed to a known fault level, which will immediately indicate the presence of a fault upon surpassing that threshold. It should be recognized that the comparator 526 could alternatively be performed by circuitry and software available within the processing unit 522.

The output analog block 530 provides digital-to-analog (D/A) converters 532 and 534. The output analog block 530 provides an analog voltage set point for the controllable voltage levels $V_M$ and $V_L$ on lines 536 and 538 respectively. The processor 522 can provide a digital signal to either of the D/A converters 532 or 534 to provide for the metallic voltage set point $V_M$ and the longitudinal voltage set point $V_L$. Alternatively, a control voltage signal generator 540 can be used to provide the digital voltage signal to the output analog block 530. In either case, a known control voltage is provided to the output analog block 530 to provide for the $V_M$ and $V_L$ voltages on lines 536 and 538 respectively.

The processor 522 is programmed to calculate the leakage impedances on the telephone subscriber line according to the control voltages applied and the currents measured by the current sense circuit 440. This can be calculated using Equation 1 below:

$$Z_{LEAKAGE} = \frac{V_{APPLIED}}{I_{MEASURED}} \quad \text{[Eq. 1]}$$

The applied voltage is known, and is the control voltage $V_M$ or $V_L$ applied at the control inputs shown on lines 402 and 404 of FIG. 4 respectively. The impedances will be resistive where only DC currents are involved. Calculated resistances falling outside of a predetermined range will be detected as a fault condition.

Table 1 below provides an example of three test conditions providing six current measurements which will provide adequate information to calculate the metallic leakage resistances and both of the longitudinal leakage resistances. Both the sum and difference currents are recorded for each of the three test conditions.

TABLE 1

| $V_L$ | $V_M$ | MEASUREMENT |
|---|---|---|
| $V_A + V_B/2$ | — | SUM AND DIFFERENCE CURRENT |
| GROUND | — | SUM AND DIFFERENCE CURRENT |
| $V_{BAT}/2$ | $V_A - V_B$ | SUM AND DIFFERENCE CURRENT |

From these measured values, those skilled in the art can calculate leakage impedances. The following equations, using the legend below, provide examples of calculations performed using the sum and difference current parameters gathered.

$G_a$ = conductance from A line to ground $V_{AG}$
$G_b$ = conductance from B line to ground $V_{BG}$
$G_{ab}$ = conductance between lines A and B
$V_L$ = longitudinal voltage control signal
$V_M$ = metallic voltage control signal
$K_M$ = converts metallic current to sense signal (ADC gain)
$E_M$ = metallic ADC gain error
$S_{M\emptyset}$ = signal offset with no current
$K_L$ = converts longitudinal current to sense signal (ADC gain)
$E_L$ = longitudinal ADC gain error
$S_{L\emptyset}$ = signal offset with no current Metallic Current Sense Signal [Eq. 2]

$$S_M(V_L, V_M) = K_M(1+E_M)\left[\left(G_{ab} + \frac{G_a+G_b}{4}\right)V_M + \left(\frac{G_a-G_b}{2}\right)V_L - \left(\frac{G_a V_{AG} - G_b V_{BG}}{2}\right)\right] + S_{M\emptyset}$$

Longitudinal Current Sense Signal [Eq. 3]

$$S_L(V_L, V_M) = K_L(1+E_L)\left[\left(\frac{G_a-G_b}{4}\right)V_M + \left(\frac{G_a+G_b}{2}\right)V_L - \left(\frac{G_a V_{AG} + G_b V_{BG}}{2}\right)\right] + S_{L\emptyset}$$

Sum of Conductances to Ground [Eq. 4]

$$G'_{g\,def} \frac{S_L(V_{L1}, V_{M\emptyset}) - S_L(V_{L\emptyset}, V_{M\emptyset})}{K_L \cdot (V_{L1} - V_{L\emptyset})} = \left(\frac{G_a+G_b}{2}\right)(1+E_L)$$

Difference of Conductances to Ground [Eq. 5]

$$G'_{d\,def} \frac{S_M(V_{L1}, V_{M\emptyset}) - S_M(V_{L\emptyset}, V_{M\emptyset})}{K_M \cdot (V_{L1} - V_{L\emptyset})} = \left(\frac{G_a-G_b}{2}\right)(1+E_M)$$

Total Metallic Conductance [Eq. 6]

$$G'_{M\,def} \frac{S_M(V_{L\emptyset}, V_{M1}) - S_M(V_{L\emptyset}, M_{\emptyset})}{K_M \cdot (V_{M1} - V_{M\emptyset})} = \left(G_{ab} + \frac{G_a+G_b}{4}\right)(1+E_M)$$

-continued

A to Ground Resistance [Eq. 7]

$$R'_{a \underline{def}} \frac{1}{G'_s + G'_d} = \frac{R_a}{1 + \frac{1}{2}(E_L + E_M) + \frac{R_a}{2R_b}(E_L - E_M)}$$

B to Ground Resistance [Eq. 8]

$$R'_{b \underline{def}} \frac{1}{G'_s - G'_d} = \frac{R_b}{1 + \frac{1}{2}(E_L + E_M) + \frac{R_a}{2R_a}(E_L - E_M)}$$

Metallic Resistance [Eq. 9]

$$R'_{ab \underline{def}} \frac{1}{G'_M - \frac{1}{2}G'_s} = \frac{R_{ab}}{1 + E_M + \left(\frac{R_{ab}}{4R_a} + \frac{R_{ab}}{4R_b}\right)\left(E_M - \frac{1}{2}E_L\right)}$$

As noted above, the present invention provides a system and method for determining the existence and magnitude of leakage resistances on a telephone subscriber line. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A telephone subscriber loop diagnostic system for determining leakage impedances on a telephone subscriber loop, comprising:

a control signal generation unit to generate voltage control signals corresponding to desired subscriber loop voltage characteristics;

a current drive circuit coupled to the subscriber loop and to the control signal generation unit to drive a current onto the subscriber loop in response to the voltage control signals, wherein the current drive circuit also serves to drive current onto the subscriber loop during normal communication operation on the telephone subscriber loop;

a voltage sense circuit coupled to the subscriber loop to compare the voltage control signals to actual subscriber loop voltage characteristics resulting from driving the current on the subscriber loop, and to adjust the current driven onto the subscriber loop in response thereto; and a processing unit coupled to receive an indication of a current level of the current driven onto the subscriber loop, and to calculate the leakage impedances on the subscriber loop in response to the current level and the voltage control signals.

2. The telephone subscriber loop diagnostic system as in claim 1, wherein the current drive circuit coupled comprises a current sensing circuit to provide the indication of the current level by sensing the current driven onto the subscriber loop.

3. The telephone subscriber loop diagnostic system as in claim 2, wherein:

(a) the current drive circuit comprises:
 (i) a first current-mode amplifier coupled to the tip line of the subscriber loop to drive a first current through a first sense resistance at the tip line; and
 (ii) a second current-mode amplifier coupled to the ring line of the subscriber loop to drive a second current through a second sense resistance at the ring line;

(b) the current sensing circuit comprises:
 (i) a first current-generating resistance to generate a sense current proportional to the first current in response to a first voltage drop across the first sense resistance; and
 (ii) a second current-generating resistance to generate a sense current proportional to the second current in response to a second voltage drop across the second sense resistance.

4. The telephone subscriber loop diagnostic system as in claim 1, further comprising user input coupled to the control signal generation unit to allow for user-programmable voltage control signals.

5. The telephone subscriber loop diagnostic system as in claim 1, wherein the voltage sense circuit comprises:

a differential amplifier coupled to the subscriber loop and the control signal generation unit to determine a difference between the actual subscriber loop voltage characteristics to the voltage control signals; and a summing amplifier coupled to the subscriber loop and the control signal generation unit to determine value proportional to the sum of the voltages on the subscriber loop.

6. The telephone subscriber loop diagnostic system as in claim 5, wherein the summing amplifier provides a gain of approximately 0.5 to bias the value at a common-mode voltage.

7. The telephone subscriber loop diagnostic system as in claim 1, wherein the subscriber loop is a two-wire connection capable of providing voice and data communication.

8. An integrated current-drive, voltage-sense subscriber loop diagnostic apparatus and subscriber line interface for providing an interface between a central office facility and a subscriber loop, and for allowing diagnostics to be performed via the interface, comprising:

a control signal generation unit to generate voltage control signals corresponding to desired subscriber loop voltage characteristics;

a tip line current-mode amplifier coupled to a tip line of the subscriber loop to drive a first operational current on the tip line during normal communication operation, and further coupled to the control signal generation unit to drive a tip line diagnostic current onto the tip line in response to the voltage control signals;

a ring line current-mode amplifier coupled to a ring line of the subscriber loop to drive a second operational current on the ring line during normal communication operation, and further coupled to the control signal generation unit to drive a ring line diagnostic current onto the ring line in response to the voltage control signals;

a voltage sense circuit coupled to the subscriber loop to compare the voltage control signals to actual subscriber loop voltage characteristics resulting from driving the tip line and ring line diagnostic currents on the subscriber loop, and to adjust the tip line and ring line diagnostic currents driven onto the subscriber loop in response thereto; and a processing unit coupled to receive an indication of a current level of the tip line and ring line diagnostic currents driven onto the subscriber loop, and to calculate the leakage impedances on the subscriber loop in response to the current level and the voltage control signals.

9. The subscriber loop diagnostic apparatus as in claim 8, further comprising analog-to-digital converters to convert the current level to a digital current level.

10. The subscriber loop diagnostic apparatus as in claim 8, wherein the control signal generation unit comprises a processor to generate predetermined digital values corresponding to the voltage control signals.

11. The subscriber loop diagnostic apparatus as in claim 10, further comprising digital-to-analog converters to convert the predetermined digital values to the voltage control signals.

12. A method for performing leakage impedance diagnostics on a telephone subscriber loop comprising an A line and a B line, comprising:

generating control signals corresponding to desired telephone line signal levels;

driving current onto the A and B lines having magnitudes proportional to their respective control signals, wherein the current is driven by drive circuitry also used to drive an operational current onto the telephone subscriber loop during normal communication operation on the telephone subscriber loop;

sensing A and B line voltages on the subscriber loop as a result of driving the current onto the A and B lines;

adjusting the control signals based on A and B line voltage feedback;

adjusting the current driven on the A and B lines in response to the adjusted control signals; and calculating the line impedance based on the control signals and the current driven on the A and B lines.

13. The method as in claim 12, further comprising sensing the current driven on the A and B lines to determining the direction and magnitude of the current driven onto the line.

14. The method as in claim 13, wherein sensing the current comprises sensing a voltage drop across a resistor in series with the current driven onto the A and B lines.

15. The method as in claim 12, wherein driving current comprises driving a first current on the A line with a first current driver, and driving a second current on the B line with a second current driver.

16. A method for determining longitudinal leakage conductances on a telephone subscriber loop having tip and ring lines, comprising:

generating a longitudinal voltage control signal;

driving currents proportional to the longitudinal voltage control signals onto the ring and tip lines, wherein the current is driven by mutual drive circuitry also used to drive an operational current onto the telephone subscriber loop during normal communication operation on the telephone subscriber loop;

sensing a line voltage on the ring and tip lines resulting from driving the currents onto the ring and tip lines;

providing voltage feedback from the line voltage to adjust a magnitude of the currents driven onto the ring and tip lines;

sensing a current magnitude of the current driven onto the ring and tip lines; and calculating the longitudinal leakage impedance using the longitudinal voltage control signal and the current magnitude.

17. A method for determining metallic leakage conductances on a telephone subscriber loop having tip and ring lines, comprising:

generating a metallic voltage control signal;

driving currents proportional to the metallic voltage control signals onto the ring and tip lines, wherein the current is driven by mutual drive circuitry also used to drive an operational current onto the telephone subscriber loop during normal communication operation on the telephone subscriber loop;

sensing a line voltage on the ring and tip lines resulting from driving the currents onto the ring and tip lines;

providing voltage feedback from the line voltage to adjust a magnitude of the currents driven onto the ring and tip lines;

sensing a current magnitude of the current driven onto the ring and tip lines; and calculating the metallic leakage impedance using the metallic voltage control signal and the current magnitude.

* * * * *